Sept. 27, 1966 A. H. VEDVIK 3,275,165
TRANSFER MECHANISM FOR SMALL ELONGATE ARTICLES
Original Filed Jan. 29, 1963 4 Sheets-Sheet 1
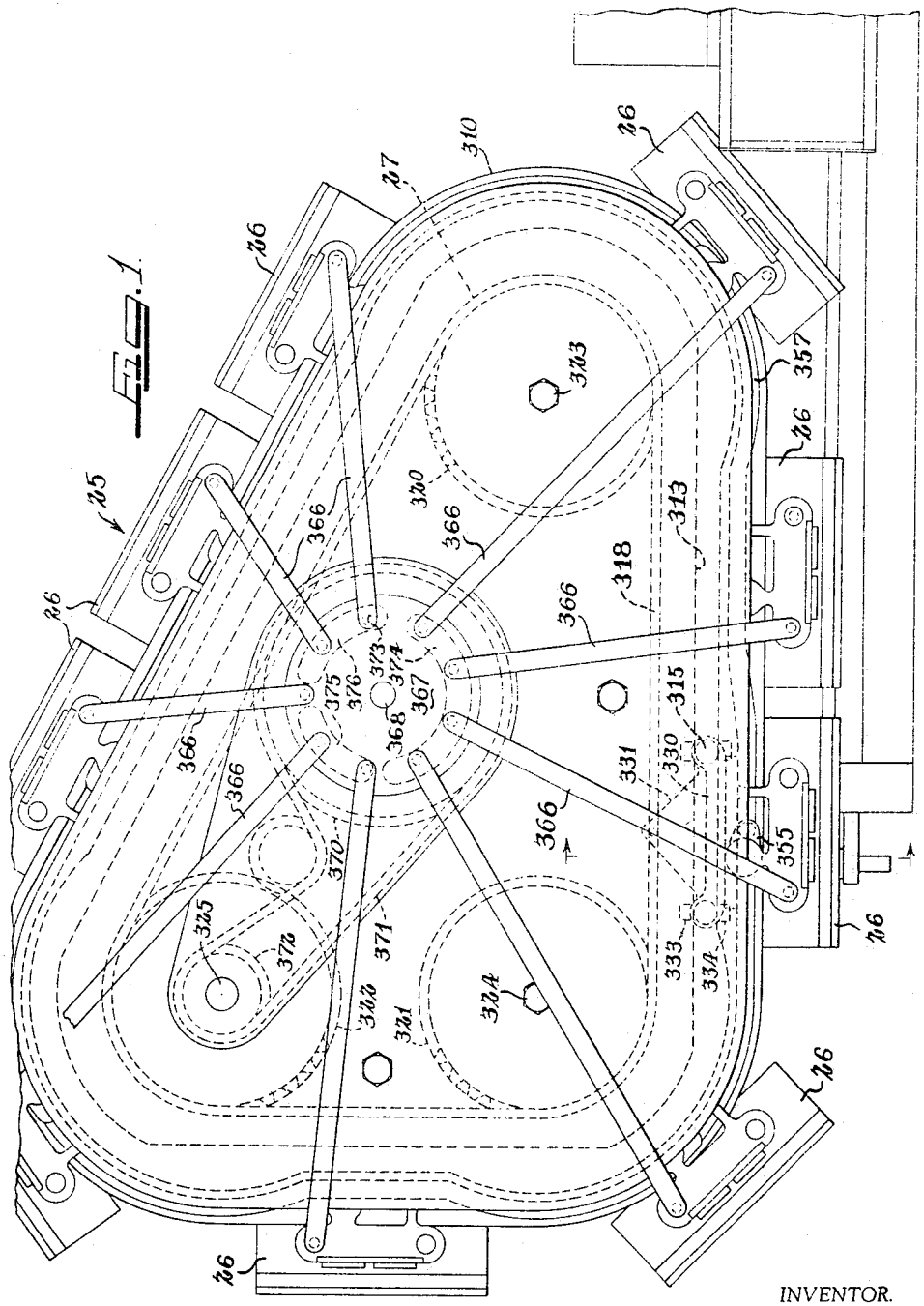
INVENTOR.
ANDREW H. VEDVIK
BY Treist, Lockwood
Greenawalt & Dewey.
Attys.

Sept. 27, 1966  A. H. VEDVIK  3,275,165
TRANSFER MECHANISM FOR SMALL ELONGATE ARTICLES
Original Filed Jan. 29, 1963  4 Sheets-Sheet 2
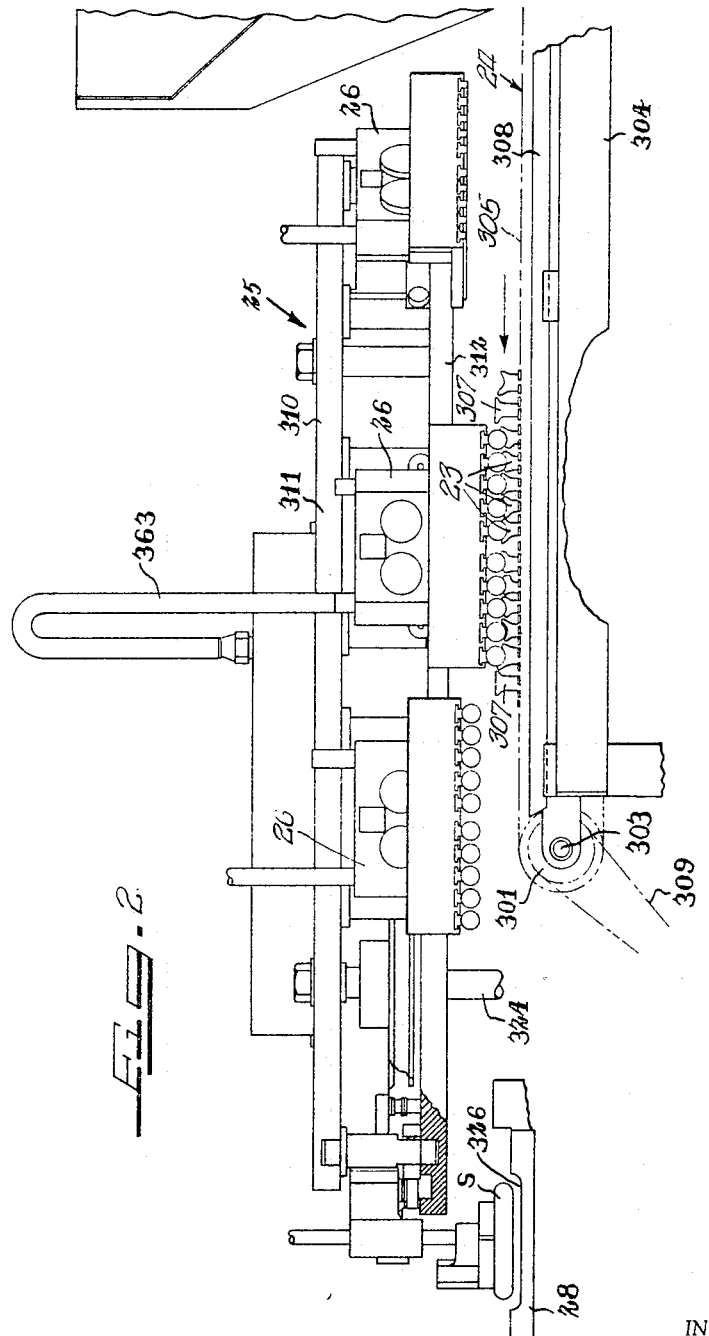
INVENTOR.
ANDREW H. VEDVIK

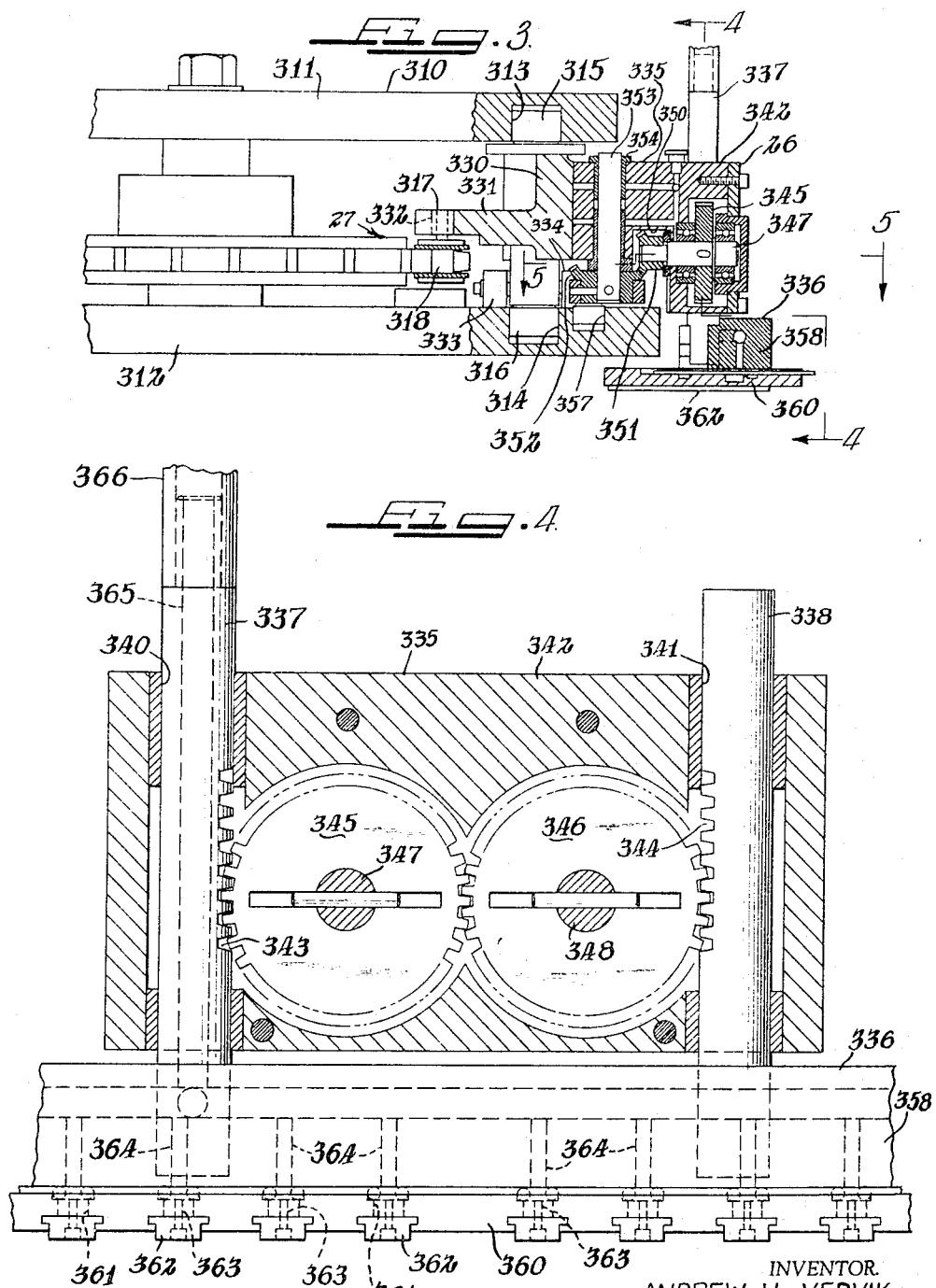

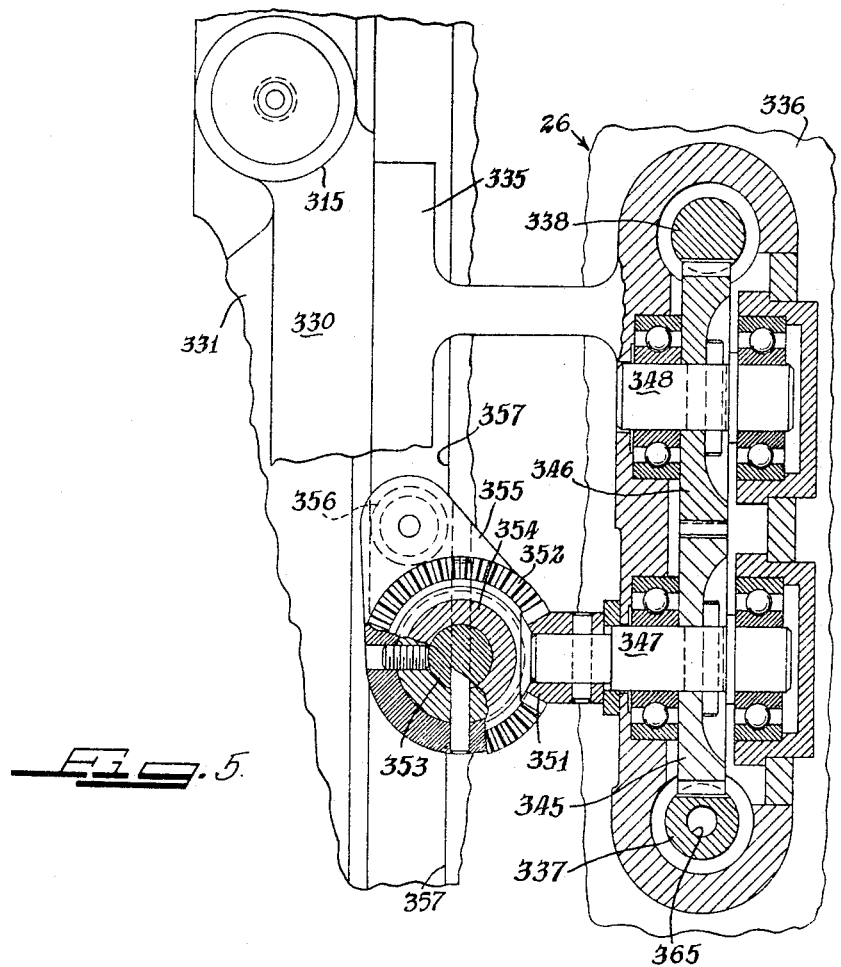

United States Patent Office 3,275,165
Patented Sept. 27, 1966

3,275,165
TRANSFER MECHANISM FOR SMALL ELONGATE ARTICLES
Andrew H. Vedvik, Madison, Wis., assignor to Oscar Mayer & Co., Inc., Chicago, Ill., a corporation of Illinois
Original application Jan. 29, 1963, Ser. No. 254,745, now Patent No. 3,217,766, dated Nov. 16, 1965. Divided and this application July 20, 1965, Ser. No. 473,447
6 Claims. (Cl. 214—1)

This application is a division of Serial No. 254,745, filed January 29, 1963, now Patent Number 3,217,766.

This invention relates to article handling equipment and is more particularly concerned with improvements in apparatus for receiving elongated, generally cylindrical articles which are advancing in the direction of their long axes and in one or more parallel lanes, for arranging the articles in spaced groups, and for delivering the groups to a wrapping machine or other handling equipment.

It is a general object of the invention to provide in an article handling and transporting apparatus which receives elongated cylindrical articles, such as sausages which are oriented in a longitudinal direction, and arranges the articles in an orderly manner and at a uniform rate on a grouping conveyor, improved mechanism for picking up the articles in predetermined groups and/or quantities from the grouping conveyor and depositing the groups on an infeed conveyor for a packaging machine or the like.

It is a still further object of the invention to provide in an apparatus for handling small elongate articles such as sausages, a transfer mechanism which comprises a conveyor having a series of vacuum heads thereon which travel in a path outboard of the path of the conveyor and which are provided with individual vacuum pick-up means for picking up the required number of sausages to make up the desired group and which transfers the groups from the grouping conveyor to pockets on an infeed conveyor of a packaging machine or the like.

These and other objects and advantages of the invention will be apparent from a description of the apparatus which is shown by way of illustration in the accompanying drawings wherein:

FIGURE 1 is a plan view with portions broken away at the discharge or exit end of apparatus for transporting small sausages, showing a group transfer mechanism for delivering the sausages in groups to an infeed conveyor of a wrapping machine;

FIGURE 2 is a side elevation of the apparatus shown in FIGURE 1;

FIGURE 3 is a vertical section taken on the line 3—3 of FIGURE 1, to an enlarged scale;

FIGURE 4 is a fragmentary section taken on the line 4—4 of FIGURE 3, to an enlarged scale; and FIGURE 5 is a fragmentary section taken on the line 5—5 of FIGURE 3.

Referring to the drawings, the apparatus illustrated is especially designed for use in a sausage manufacturing or processing operation where link sausages are delivered to the apparatus from casing stripping mechanisms by a conveying, accumulating and arranging mechanism which deposits the sausages in groups of a predetermined number in the pocket forming members 23 on the horizontally disposed top run of a conveyor 24 which advances the groups of sausages to a pick-up station below the group transfer device 25 (FIGURES 1 and 2). The group transfer device 25 comprises a plurality of pick-up heads 26 mounted on an endless chain conveyor 27 which is guided in a horizontal path having adjoining sections thereof extending at right angles to each other and the pick-up heads 26 are operated to pick up successive groups of sausages from the conveyor 24 and deposit the same in the pockets of an infeed conveyor 28 of a wrapping machine (not shown).

The conveyor 24 (FIGURE 2) which receives the sausages from the accumulator device (not shown) is supported at its leading end on sprocket 301 mounted on cross shaft 303 journaled at the leading end of an upright, horizontally disposed supporting frame 304. The conveyor 24 comprises laterally spaced chains 305 carrying upwardly opening, relatively shallow pocket forming members 23 which are arranged in groups of a predetermined number in side-by-side relation with the groups separated by spacers 307. The upper run of the conveyor 24 is supported in a horizontal position on guide rails 308 with the trailing end of the conveyor traveling in a path beneath the accumulator device and the leading end thereof advancing beneath the pick-up or transfer heads 26 on the group transfer apparatus 25 during a portion of the travel of the heads 26. The shaft 303 at the leading end of the conveyor 24 is driven by a chain and sprocket connection 309 to the packaging machine (not shown) in timed relationship.

The pick-up apparatus 25 (FIGURES 1 to 5) comprises a horizontally disposed frame 310 which is formed primarily by vertically spaced upper and lower plates 311 and 312. The plates 311 and 312 are provided on their inner opposed faces with guideway forming grooves or recesses 313 and 314 which constitute tracks for receiving pairs of spaced top and bottom guide rollers 315 and 316 on the pick-up heads 26. The heads 26 are each pivotally mounted at 317 on an endless traveling chain 318 which is supported for movement in a horizontal path on sprockets 320, 321 and 322 which are mounted on vertical shafts 323, 324 and 325 arranged at the three corners of the triangular shaped frame 310. One of the chain carrying sprockets has its shaft 325 extended downwardly and connected in a suitable manner to the packaging machine (not shown) for rotating the same. The power connection is preferably with the driving mechanism for the infeed conveyor 28 of the wrapping machine so that the mechanism may be readily synchronized with the movement of the conveyor 28 in the pockets 326 on which the sausages S are deposited by operation of the transfer heads 26.

Each of the transfer heads 26 comprises a bar-like base 330 (FIGURES 1 and 3) having a triangular extension 331 which is provided with an aperture 332 for receiving the pivot 317 on the transporting conveyor 318. The bar 330 carries the pairs of guide rollers 315 and 316 at opposite ends thereof and on its top and bottom faces. The base 300 also carries pairs of supporting rollers 333 and 334 at opposite ends thereof adjacent the lower face which bear on the topmost surface of the lower plate 312 of the frame on opposite sides of the guide track 314. A head bracket 335 is secured on the outside face of the bar member 330 and is recessed to form a housing for a rack and pinion mechanism (FIGURE 4) for raising and lowering a suction pick-up assembly 336 which is mounted on a pair of vertically disposed post members 337 and 338. The post members 337 and 338 are slidably mounted in guideway forming bores 340 and 341 at opposite ends of the outside portion 342 of the bracket 335. The post members 337 and 338 have teeth cut in the surfaces thereof which oppose each other so as to form rack sections 343 and 344 which are engageable with a pair of pinions 345 and 346. The pinions 345 and 346 are mounted on small shafts 347 and 348 which are journaled in the housing forming bracket 335 and which are in engagement with each other and with the rack sections 343 and 344 on the posts 337 and 338. The one shaft 347 is extended into a recess 350 (FIGURE 3) at one end of the bracket and receives a beveled pinion 351 which is driven by a pinion 352 on a vertically disposed shaft 353 mounted in a bearing sleeve 354 in a vertical aperture in the bracket 335. A crank arm 355 is secured to the pinion 352 and carries at its free end a roller 356 which operates in a cam track 357 provided in the frame bottom plate 312 adjacent the guideway slot 314. The cam track 357 is arranged so as to turn the crank arm 355 and thereby rotate the elevating gears 345 and 346 to raise and lower the sausage pick-up assembly 336 at the proper time for pick up or deposit of the sausages.

The pick-up assembly 336 comprises a manifold forming member 358 which is secured on the bottom ends of elevating posts 337 and 338 and a pad supporting plate 360 on its bottom face with a plurality of spaced transverse slots or grooves 361 opening downwardly of the lower face for receiving suction pads 362. The suction pads are preferably of rubber and are provided with passageways 363 opening on their bottom surfaces and connected by passageways 364 in the manifold 358 and 365 in the one post member 337. A flexible conduit or hose 366 connects the post member 337 with an air box 367 in the center of the frame 310. The air box 367 is mounted for rotation about a post 368 and provided with a sprocket 370 which is connected by the chain 371 with a driving sprocket 372 on the top of the one chain sprocket carrying shaft 325. Each conduit 366 provides a port or opening 373 in the bottom face of the box 367 which serves to connect the head successively, as the box 367 rotates, with a vacuum port 374, an atmosphere port 375, and a compressed air port 376, all of which are provided as indicated in FIGURE 3, in the upper face of the base 377 on which the box 367 revolves. With this arrangement vacuum is applied to the head 26 for pick up of the sausages from conveyor 24, the vacuum is broken as the head reaches the position for discharge of the sausages onto conveyor 28 and thereafter air is blown through the head to keep the passages to the suction pads 362 free of any obstructions.

I claim:

1. Apparatus for transferring groups of elongate articles having the form of small sausages from a supply conveyor to a discharge station which comprises a supporting frame including vertically spaced plates of generally triangular shape arranged one above the other, a conveyor chain mounted on supporting sprockets which are disposed in a triangle and in a common plane with the sprockets mounted on shafts which are parallel and normal to the plane of the bottom frame plate, a plurality of pick-up heads pivotally connected to said conveyor chain and having a portion thereof extending outboard of the perimeter of said supporting frame, spaced cam rollers on said heads received in cam tracks in said frame plates for guiding the heads in a generally triangular path extending at one side of the supporting frame above a supply conveyor on which the articles are arranged in single line, side-by-side relation, each of said heads having an article pick-up member mounted on the bottom thereof so that it is movable in a path which is normal to the path of movement of the head, and means for applying suction to the pick-up member so as to pick up successive groups of articles and transport said articles to a discharge station along an adjoining side of said supporting frame.

2. Apparatus for transporting elongate articles having the form of small sausages from a conveyor on which the articles are arranged in groups through an angular path to a discharge station, said apparatus comprising a supporting frame mounted in fixed relation relative to the conveyor and the discharge station which frame includes vertically spaced plate-like members arranged one above the other, a traveling conveyor chain carried on supporting sprockets between said plate-like members, which sprockets are mounted on parallel shafts extending normal to the plane of said plate-like members and spaced to provide a conveyor path extending along adjoining angularly related sides of said frame, a plurality of pick-up heads pivotally connected to said conveyor chain and having a portion thereof extending outboard of the perimeter of said supporting frame, spaced cam rollers on said heads, cam tracks on said plate-like members receiving the cam rollers and guiding the heads in a path extending along one of said angularly related sides of the frame above a conveyor on which articles are arranged in side-by-side relation and in groups of a predetermined number, each of said heads having an article pick-up plate mounted on the bottom thereof for movement in a path which is normal to the path of movement of the head, article engaging pad members of resilient material on said pick-up plate, and means for applying suction to said pad members so as to pick up successive groups of articles and transport them to a discharge station along said adjoining side of said frame.

3. Apparatus as recited in claim 2, and said pick-up heads comprising a bracket member having a recess forming a pinion housing and having parallel, vertical bores for a pair of rack members on the lower ends of which said pick-up plate is carried, pinions in said pinion housing which engage with the rack members and with each other, said pinions being mounted on parallel shafts, one of said pinion shafts having a gear on an extended end thereof which engages with a gear on a vertical shaft mounted in said bracket member, a rocker arm extending in the plane of said gear, a cam roller on said rocker arm and engaging in a cam track in one of said plate-like frame members so as to rotate said pinions and raise and lower said pick-up plate.

4. Apparatus for transporting elongate articles having the form of small sausages from a conveyor on which the articles are arranged in groups to a discharge station through a path having adjoining sections thereof at right angles, said apparatus comprising a supporting frame including vertically spaced, horizontally disposed plate-like members arranged one above the other, a conveyor chain carried on supporting sprockets between said plate-like members, which sprockets are mounted on parallel shafts extending normal to the plane of said plate-like members, a plurality of pick-up heads pivotally connected to said conveyor chain and having a portion thereof extending outboard of the perimeter of said supporting frame, said pick-up heads each including a supporting bracket, spaced cam rollers on said bracket which are received in cam tracks on said plate-like members for guiding the head in a path extending at one side of the frame above a traveling conveyor on which articles are arranged in side-by-side relation and in groups of a predetermined number, an article pick-up plate mounted on the bottom of said bracket for movement in a vertical path, said bracket having parallel spaced vertical bores, rack forming guide members mounted in said bores and connected at their lower ends to said article pick-up plate, pinions mounted on said bracket and engaging said rack forming guide members, and means for rotating said pinions in timed relation to the movement of the pick-up head, article engaging pad members of resilient material on said pick-up plate and means for applying suction to said pad members so as to pick up successive groups of articles from said traveling conveyor and transport them to a discharge station along an adjoining side of said frame.

5. Apparatus for transferring groups of elongate articles having the form of small sausages from a supply conveyor to a discharge station through a path having adjoining sections thereof at right angles which comprises a supporting frame including vertically spaced frame members arranged one above the other at a fixed position along said conveyor, a conveyor chain mounted on supporting sprockets which are disposed in a common plane with the sprockets mounted on shafts which are parallel and normal to the plane of the bottom frame member, a plurality of pick-up heads pivotally connected to said conveyor chain and having a portion thereof extending outboard of the perimeter of said supporting frame, said pick-up heads including brackets having spaced cam rollers thereon and cam tracks in said frame members for receiving the cam rollers and guiding the heads in a path extending along one side of the supporting frame above a supply conveyor on which the articles are arranged in single line, side-by-side relation, each of said heads having a pick-up member for a group of the articles mounted on the bottom thereof so that it is movable in a path which is normal to the path of movement of the head, and means for applying suction to the pick-up member so as to pick up successive groups of articles and transport said articles to a discharge station along an adjoining side of said supporting frame which is at right angles to said one side.

6. Apparatus for transporting elongate articles having the form of small sausages from a conveyor on which the articles are arranged in groups through an angular path to a discharge station, said apparatus comprising a supporting frame including vertically spaced generally triangular shaped frame members arranged one above the other with one side thereof extending in a fixed position along said article conveyor, an endless pick-up conveyor carried on supporting members between said frame members, which supporting members are mounted on parallel shafts extending normal to the plane of said frame members, a plurality of pick-up heads swingably connected to said conveyor and having a portion thereof extending outboard of the perimeter of said supporting frame, spaced cam members on said heads and cam tracks on said frame members for receiving said cam members and guiding the heads in a path extending along the side of said supporting frame above a traveling conveyor on which articles are arranged in side-by-side relation and in groups of a predetermined number, each of said heads having means for picking up a plurality of articles mounted on the bottom thereof and movable in a path which is normal to the path of movement of the head, said means including a bottom plate and article engaging members of resilient material on said pick-up plate, means for operating the pick-up conveyor in timed relation to the movement of the article conveyor, and means for applying suction to said article engaging members so as to pick up successive groups of articles and transport them to a discharge station along an adjoining side of said frame.

References Cited by the Examiner

UNITED STATES PATENTS

| | | | |
|---|---|---|---|
| 2,611,493 | 9/1952 | Nordquist | 214—1 |
| 2,903,121 | 9/1959 | Knapp | 214—1 X |
| 2,967,568 | 1/1961 | Friday | 214—1 X |
| 3,125,228 | 3/1964 | Laidig | 214—1 |

MARVIN A. CHAMPION, *Primary Examiner.*